Oct. 25, 1927.

A. B. SEVERN 1,646,769

SIDE BEARING

Filed April 30, 1927

WITNESSES
A. B. Wallace.

INVENTOR
Arthur B. Severn
By Winter, Brown
& Critchlow
his attorneys

Patented Oct. 25, 1927.

1,646,769

UNITED STATES PATENT OFFICE.

ARTHUR B. SEVERN, OF PITTSBURGH, PENNSYLVANIA, ASSIGNOR TO A. STUCKI, OF PITTSBURGH, PENNSYLVANIA.

SIDE BEARING.

Application filed April 30, 1927. Serial No. 187,773.

The invention relates to roller side bearings for railway cars, and the object thereof is to provide such a bearing with simple and effective means for moving to its central position a cylinderical roller which is supported by a plane-faced bearing plate.

Figure 1:
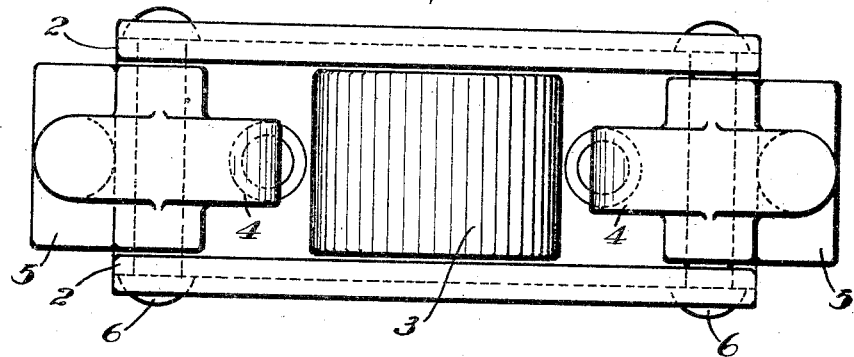
Figure 2:
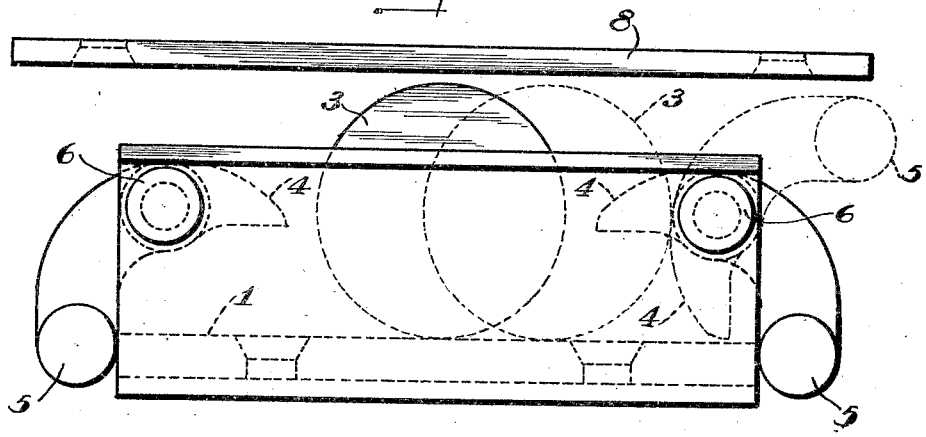
Figure 3:
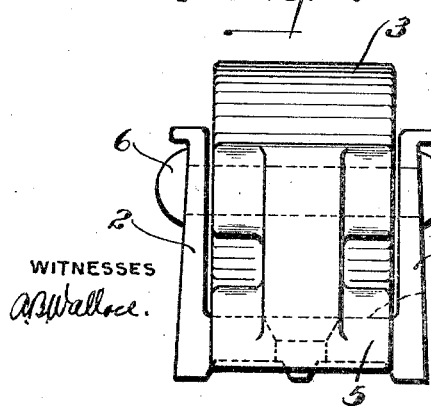

The invention is illustrated in the accompanying drawings of which Fig. 1 is a plan view of a roller bearing; Fig. 2 a side view of the bearing showing an upper bearing plate arranged above it, and showing some of its parts in dotted lines in alternate positions; Fig. 3 an end view of the bearing; and Fig. 4 an end view showing a modification in detail of construction.

The roller side bearing provided according to this invention comprises a cage having a plane-faced bearing plate for supporting a roller. On opposite sides of the roller there are pivotally mounted fingers which normally project into the path along which the roller moves when a bolster bearing plate rests upon the roller and a truck swivels or turns with relation to the bolster to render the roller active. These fingers are turned out of their positions when the roller becomes active and moves in the manner explained, and are counterweighted in such a manner that, when the load is removed from the roller, the roller is moved by the fingers toward its normal central inactive position.

Figure 4:
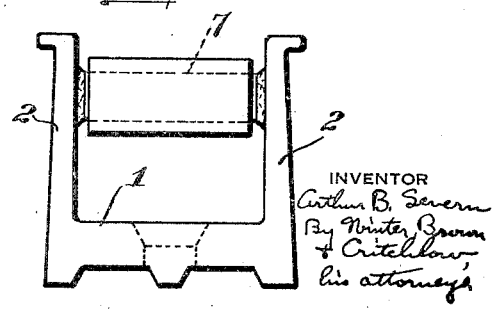

In the illustrative embodiment of the invention, the roller cage is shown as comprising a channel having a plane-faced web or bottom 1, and side plates or flanges 2. The bottom 1 of the cage forms a bearing plate for a roller 3, which is preferably of truly cylindrical form, and also preferably solid throughout rather than being counterweighted. In Fig. 1, and also in full lines in Fig. 2, the roller is indicated as being in its central inactive position. At each side of the roller there is a finger 4 pivotally mounted in the side plates 2 of the roller cage. Each finger is preferably a casting including a counterweight 5 which may bear against the end of the roller cage to normally hold the end of the finger somewhat below the axis of the roller and in line with its path of movement. The fingers may be pivotally attached to the cage by rivets 6, as shown in Figs. 1, 2 and 3, or, as shown in Fig. 4, the ends of pivot pins 7 may be welded to the side plates of the roller cage thereby avoiding the necessity of punching these plates close to their upper edges.

As is well known, roller bearings of the type here contemplated are borne by the trucks of railway cars, a bearing plate 8 being attached to the bolster of the car and adapted to bear upon a roller when the car body sways laterally. When a car body thus sways, and its truck swivels with relation to the body, the roller is rendered active and rolls upon its lower bearing. As shown in dotted lines in Fig. 1, roller 3 has been thus moved to the right, and in such movement has turned finger 4 downwardly raising its counterweight 5. When upper bearing plate 8 no longer rests upon roller 3, the counterweight 5 of depressed finger 4 becomes effective to raise the finger to move the roller towards its central position in the roller cage. The inner ends of the fingers are, as shown, preferably spaced from each other a distance greater than the diameter of the roller so that the roller will not be continuously engaged by the fingers. Thus the roller has a limited amount of freedom for rendering the vibrations of a truck effective to revolve the roller on its axis and thereby avoid its becoming worn unevenly.

It is characteristic of this invention that a cylindrical roller rides on a plane-faced bearing plate, and accordingly does not raise the bolster of a car when the truck swivels. Furthermore, by the provision of the roller centralizing pivoted fingers, the roller may be solid throughout, thus eliminating the necessity of providing a more expensive and less durable counterweighted roller. However, it will be understood that the invention is not limited to the use of a solid cylindrical roller.

According to the provisions of the patent statutes, I have explained the principle and operation of my invention and have illustrated and described what I now consider to represent its best embodiment. However, I desire to have it understood that, within the scope of the appended claims, the invention may be practiced by other forms of construction than that particularly illustrated and described.

I claim as my invention:

1. A roller side bearing for railway cars, comprising a roller cage provided with a plane-faced bearing plate, a roller resting upon said plate, and a pair of pivotally mounted fingers arranged on opposite sides of said roller and normally projecting into its active path of movements, said fingers being counterweighted to move said roller towards its normal central position when inactive.

2. A roller side bearing for railway cars, comprising a cage provided with a plane-faced bearing plate and with side plates, a roller arranged between said side plates and resting upon said bearing plate, and a pair of fingers pivotally mounted in said side plates on opposite sides of said roller and normally projecting into its active path of movements, said fingers being counterweighted to move said roller toward its normal central position when inactive.

3. A roller side bearing for railway cars, comprising a channel-shaped cage, having a plane-faced web forming a bearing plate and having upwardly extending flanges, a solid cylindrical roller arranged between said flanges and resting upon said web, and a pair of fingers pivotally mounted in said flanges on opposite sides of said roller and normally projecting into its active path of movement, said fingers being counterweighted to move said roller towards its normal central position when inactive.

4. A roller side bearing for railway cars, comprising a roller cage provided with a plane-faced bearing plate, a roller resting upon said plate, and a pair of pivotally mounted fingers arranged on opposite sides of said roller and normally projecting into its active path of movements, each of said fingers being provided with a counterweight normally bearing against an end of said cage to hold the finger in the path of movement of said roller, the counterweight when elevated from its normal position being then effective through the finger to urge said roller toward its normal central position.

In testimony whereof, I sign my name.

ARTHUR B. SEVERN.